(12) United States Patent
Haun

(10) Patent No.: US 6,910,545 B2
(45) Date of Patent: Jun. 28, 2005

(54) HINGE ASSEMBLY FOR UTILITY VEHICLE HOOD

(75) Inventor: Robert Dale Haun, Evans, GA (US)

(73) Assignee: Deere & Co., Moline, IL (US)

( * ) Notice: Subject to any disclaimer, the term of this patent is extended or adjusted under 35 U.S.C. 154(b) by 39 days.

(21) Appl. No.: 10/041,832

(22) Filed: Oct. 19, 2001

(65) Prior Publication Data

US 2003/0075371 A1 Apr. 24, 2003

(51) Int. Cl.$^7$ .............................................. B62D 25/10
(52) U.S. Cl. .................................. 180/69.2; 180/69.21
(58) Field of Search .......................... 180/69.2, 69.21, 180/89.17, 89.18; 296/76

(56) References Cited

U.S. PATENT DOCUMENTS

| | | | | |
|---|---|---|---|---|
| 1,390,751 A | * | 9/1921 | Bell ........................... 217/60 G |
| 2,668,320 A | * | 1/1954 | Lustig ........................... 16/289 |
| 3,815,176 A | * | 6/1974 | Porter ........................... 16/288 |
| 4,012,807 A | * | 3/1977 | Kern ............................. 16/288 |
| 4,294,039 A | | 10/1981 | Dalheimer et al. |
| 4,611,680 A | * | 9/1986 | Redenbarger et al. ... 180/69.24 |
| 4,889,203 A | * | 12/1989 | Hagarty ..................... 180/69.24 |
| 4,982,993 A | | 1/1991 | Okazaki et al. |
| 5,067,759 A | * | 11/1991 | Fleming ....................... 293/109 |
| 5,101,921 A | | 4/1992 | West et al. |
| 5,136,752 A | | 8/1992 | Bening et al. |
| D335,622 | * | 5/1993 | Millsap ........................ D8/323 |
| 5,273,606 A | * | 12/1993 | Greve et al. ................. 156/216 |
| 5,339,494 A | | 8/1994 | Esau et al. |
| 5,347,799 A | * | 9/1994 | Hosaka et al. ................ 56/15.8 |
| 5,465,803 A | | 11/1995 | Kircher et al. |
| 5,535,846 A | * | 7/1996 | Kurtz et al. .............. 180/69.21 |
| 5,538,094 A | | 7/1996 | Cobes, Jr. et al. |
| 5,544,388 A | * | 8/1996 | Chiura .......................... 16/375 |
| 5,557,829 A | * | 9/1996 | Schoen et al. ................. 16/375 |
| 5,634,525 A | | 6/1997 | Templeton et al. |
| 5,645,133 A | | 7/1997 | Thompson et al. |
| 5,964,490 A | * | 10/1999 | Schroeder et al. ......... 296/35.1 |
| 6,003,204 A | | 12/1999 | Roach et al. |
| 6,141,829 | * | 11/2000 | Boyer .......................... 16/224 |
| 6,213,235 | | 4/2001 | Elhardt et al. |
| 6,227,606 | * | 5/2001 | Schroeder et al. ........ 296/146.1 |
| 6,230,364 | * | 5/2001 | Cheal ........................... 16/289 |
| 6,308,650 | * | 10/2001 | Tsumiyama et al. ...... 114/55.53 |
| 6,367,123 | * | 4/2002 | Cheal et al. ................... 16/370 |
| 6,374,936 | * | 4/2002 | Smith ....................... 180/89.17 |
| 6,397,434 | * | 6/2002 | Cheal et al. ................... 16/370 |
| 6,401,851 | * | 6/2002 | Keen ....................... 180/89.17 |
| 6,460,644 | * | 10/2002 | Smith et al. ............. 180/89.17 |
| 6,508,323 | * | 1/2003 | Burgo ..................... 180/69.21 |
| 6,520,557 | * | 2/2003 | Benthaus et al. ............. 296/76 |
| 6,618,904 | * | 9/2003 | Nagy .......................... 16/370 |

\* cited by examiner

Primary Examiner—Christopher P. Ellis
Assistant Examiner—Christopher Bottorff
(74) Attorney, Agent, or Firm—The Law Office of Randall T. Erickson, P.C.

(57) ABSTRACT

A hinge assembly is provided for hinging a hood on a utility vehicle body so as to enable the hood to open upwardly and backwardly from the front end of the utility vehicle. A bracket made from steel is secured adhesively to an underside of the hood, which is made from a polymeric material, near a back end of the hood. A double-rocker, four-link mechanism includes a lower, fixed link, an upper, coupler link, a comparatively longer, front rocker link, and a comparatively shorter, back rocker link. The front, back, and coupler links are displaceable so that the upper end of the back link is movable toward and away from the lower end of the front link. An extensible-retractable spring connected between the rocker links baises the upper end of the back link toward the lower end of the front link.

15 Claims, 3 Drawing Sheets

HINGE ASSEMBLY FOR UTILITY VEHICLE HOOD

TECHNICAL FIELD OF THE INVENTION

This invention pertains to a hinge assembly for hinging a hood on a body of a utility vehicle, such as a tractor of a type that can be selectively equipped with a loader having a bucket or with a backhoe. The hinge assembly, which comprises a double-rocker, four-link mechanism, can be advantageously employed for hinging a hood near its back end, so that the hood can open upwardly and backwardly without interfering with adjacent structures of the utility vehicle.

BACKGROUND OF THE INVENTION

In a utility vehicle of the type noted above, the hood must be hinged on the body of the utility vehicle, whether on a cooling system compartment of the body or elsewhere, so that the hood can open without interfering with other parts of the utility vehicle.

Commonly, as exemplified in U.S. Pat. Nos. 5,136,752, 5,645,133, and 6,213,235, the hood is hinged near its front end, so that the hood can open upwardly and frontwardly without interfering with adjacent structures of the utility vehicle.

A need has been ascertained, to which this invention is addressed, for a hinge assembly hinging the hood near its back end, so that the hood can open upwardly and backwardly without interfering with adjacent structures of the utility vehicle.

SUMMARY OF THE INVENTION

This invention provides a hinge assembly addressing the need noted above and comprising a double-rocker, four-link mechanism, which includes a bracket mounted to an underside of the hood, near a back end of the hood, a lower, fixed link having two opposite ends, each defined by a bracket mounted to the utility vehicle body, an upper, coupler link defined by a portion of the bracket and having two opposite ends, and two rocker links. Each rocker link has a lower end, which is connected to one of the opposite ends of the fixed link at a pivot, and an upper end, which is connected to one of the opposite ends of the coupler link at a pivot.

Preferably, the rocker links are comprised of a comparatively longer, front link and a comparatively shorter, back link, the coupler link being the shortest link. Preferably, the front, back, and coupler links are displaceable so that the upper end of the back link is movable toward and away from the lower end of the front link, between positions on opposite sides of a center line drawn between the lower end of the back link and the other end of the coupler link.

Preferably, an extensible-retractable spring is connected between the rocker links, the spring biasing the upper end of the back link toward the lower end of the front link. Preferably, the spring has a front end connected pivotally to the front link and a back end connected pivotally to the back link and, as measured along the front and back links respectively, the front end of the spring is comparatively closer to the lower end of the front link and the back end of the spring is comparatively farther from the lower end of the back link.

Preferably, the bracket is made from steel, the hood is made from vacuum-formed polypropylene, and the bracket is secured adhesively to the underside of the hood, as via an adhesive tape.

These and other objects, features, and advantages of this invention are evident from the following description of a preferred embodiment of this invention, with reference to the accompanying drawings.

DETAILED DESCRIPTION OF THE PREFERRED EMBODIMENT

Figure 1:
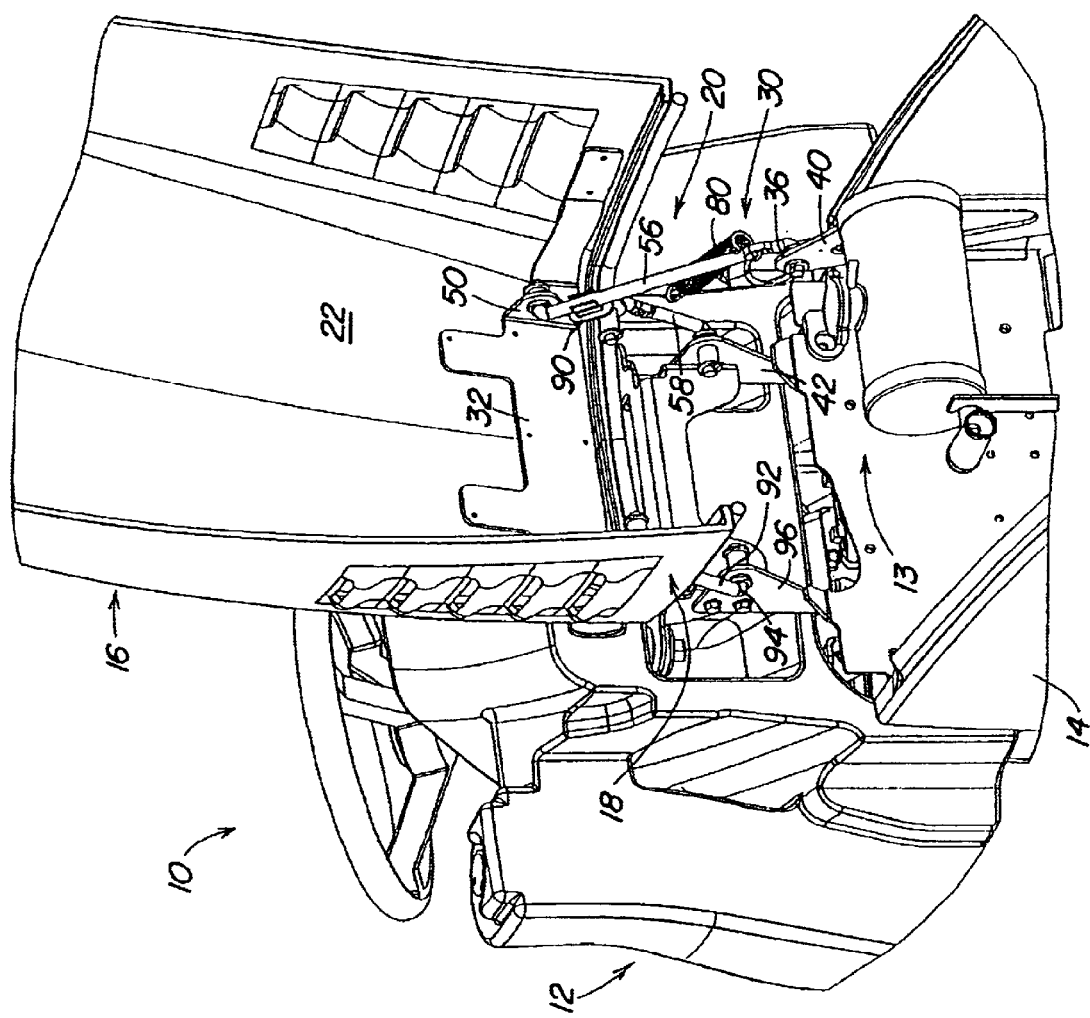
FIG. 1 is a fragmentary, perspective view of a tractor having an engine compartment, a hood, which is shown in an opened condition, and a hinge assembly, which hinges the hood to the engine compartment, at a rear portion of the hood.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

As shown, a tractor 10 has a body 12, which includes an engine compartment having a firewall 13, two side walls 14, a hood 16, which is hinged to the firewall 13 near the back end 18 of the hood 16, and a hinge assembly 20 constituting a preferred embodiment of this invention. A bracket 32 is mounted to an underside 22 of the hood 16 and extends across a region near the back end 18 of the hood 16. The hinge assembly 20, which comprises a double-rocker, four-link mechanism 30, enables the hood 16 to open upwardly and backwardly from a closed position into an opened position without interfering with adjacent structures of the tractor 10.

As shown, the hood 16 is made from a polymeric material, vacuum-formed polypropylene being a preferred material. This material provides the hood with an aesthetically pleasing, extremely smooth, paintable or pre-colored surface. As shown, the bracket 32 is made from steel, which may be desirably painted or galvanized or which may be stainless steel, and which is secured adhesively to the underside 22 of the hood 16, preferably by 3M VHB Model No. 4611 Tape, which is available commercially from Minnesota Mining and Manufacturing Company of St. Paul, Minn. Advantageously, therefore, it is not necessary to use bolts, rivets, or other mechanical fasteners to secure the bracket 32 to the underside of the hood 16.

Figure 2:
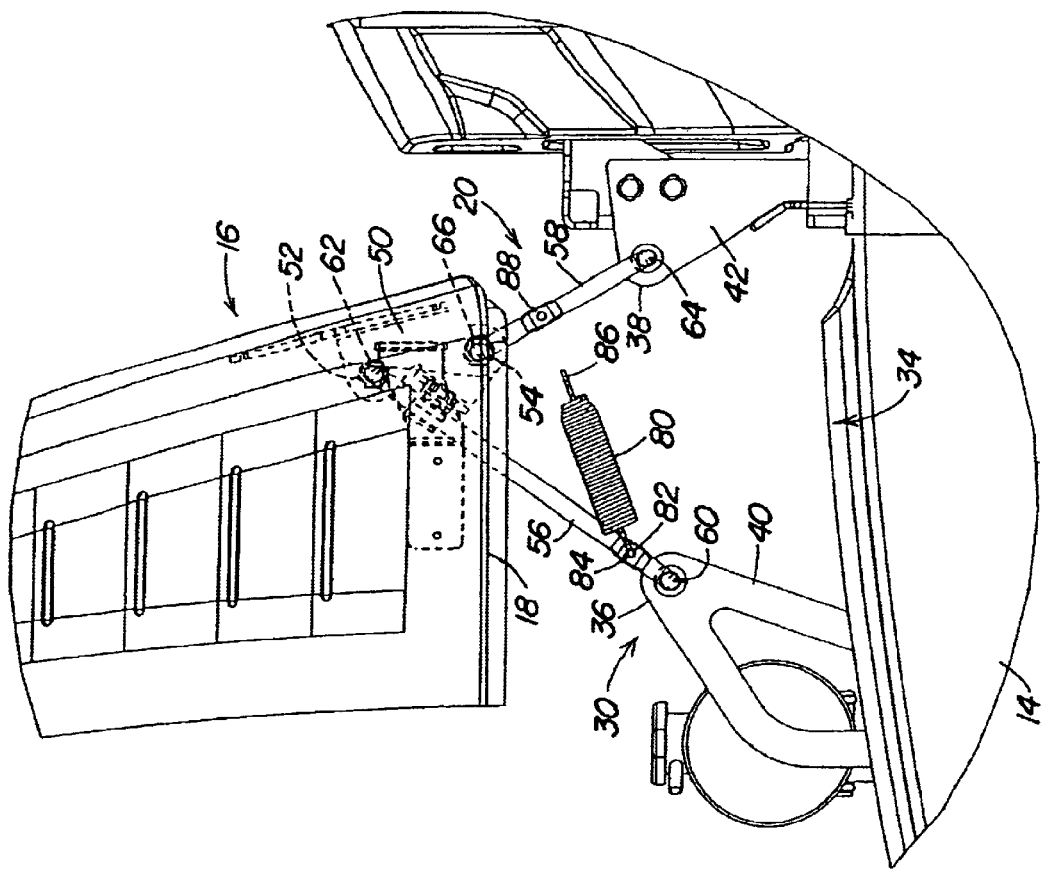
FIG. 2 is a fragmentary, side elevation of the tractor, substantially as shown in FIG. 1.
Figure 3:
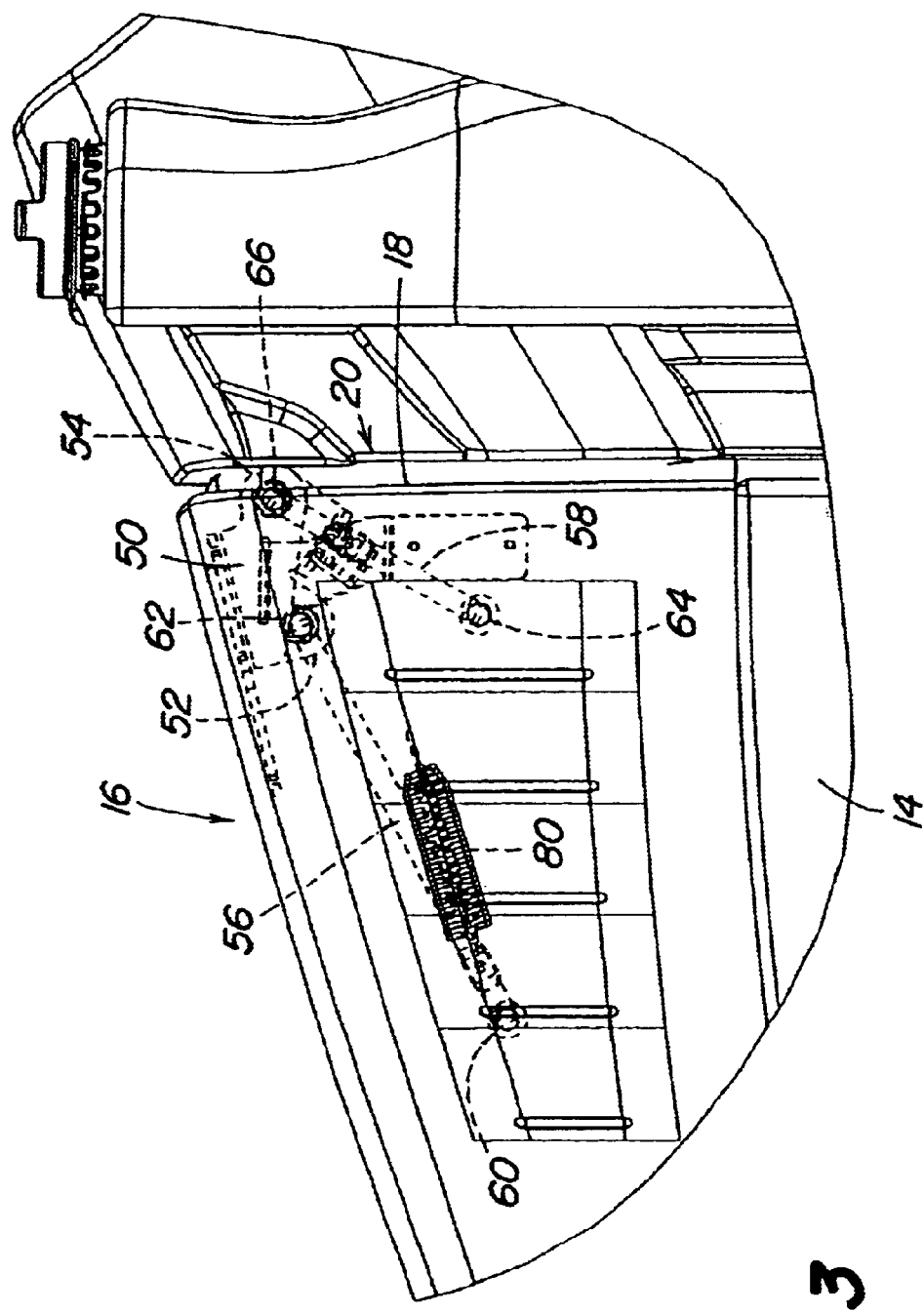
FIG. 3 is a view substantially similar to FIG. 2, except that the hood is shown in a closed condition.

The mechanism 30, which is mounted near one side of the tractor 10, includes a lower, fixed link 34, which has two opposite ends, i.e., a front end 36 and a back end 38, each being defined by a bracket 42 mounted to the firewall 13 and the forward attaching bracket 40. The bracket 40 defining the front end 36 and the bracket 42 defining the back end 38 are shown in FIG. 2.

The mechanism 30 further includes an upper, coupler link 50, which is defined by a portion of the hood-mounted bracket 32, at the same side of the tractor 10. The coupler link 50 has two opposite ends, i.e., a front end 52 and a back end 54. The mechanism 30 further includes two rocker links, i.e., a comparatively longer, front link 56 and a comparatively shorter, back link 58.

The front link 56 has a lower end 60, which is connected pivotally to the front end 36 of the fixed link 34, and an upper end 62, which is connected pivotally to the front end 52 of the coupler link 50. The back link 58 has a lower end 64, which is connected pivotally to the back end 38 of the fixed link 34, and an upper end 66, which is connected pivotally to the back end 54 of the coupler link 50.

The front link 56, the back link 58, and the coupler link 50 are displaceable so that the upper end 66 of the back link 58 and the back end 54 of the coupler link 50, where connected pivotally, are movable toward and away from the lower end 60 of the front link 56, between positions on opposite sides of a centerline drawn between the lower end 64 of the back link 58 and the front end 52 of the coupler link 50.

An extensible-retractable, coiled spring 80 has a front end 82, which is connected to the front link 56, at a connection 84 between the lower end 60 of the front link 56 and its upper end 66. The spring 80 has a back end 86, which is connected pivotally to the back link 58, at a connection 88 between the lower end 54 of the back link 58 and its upper end 66. In the drawings, for illustrative purposes, the back end 86 of the spring 80 and the connection 88 are shown as disconnected. As measured along the front link 56 and the back link 58 respectively, the front end 82 of the spring 80 is comparatively closer to the lower end 60 of the front link 56 and the back end 86 of the spring 80 is comparatively farther from the lower end 64 of the back link 58.

Thus, the spring 80 is connected so as to bias the upper end 66 of the back link 58 toward the lower end 60 of the front link 56, so as to bias the hood 16 toward the closed position when the upper end 66 of the back link 58 is in back of the centerline noted above, and so as to bias the hood 16 toward the opened position when the upper end 66 of the back link 58 is in front of the centerline noted above. The hood 16 is biased into the closed position, in which the hood rests on the cooling system compartment 16, not only by the spring 80 but also gravitationally. As shown in FIG. 1, the bracket 32 mounts a spring clamp 90, which is adapted to clamp the front link 56 releasably, so as to clamp the hood 16 releasably in the opened position.

Near the other side of the tractor 10, a back link 92, which is similar to the back link 58, has a lower end 94, which is connected pivotally to the firewall 13, via a bracket 96, and an upper end (not shown) which is connected pivotally to the bracket 32. The back link 92 averts binding or warping of the hood 16 as the hood 16 moves between its closed and opened positions.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

The invention claimed is:

1. For a tractor equipped with a loader bucket, a hinge assembly for hinging a tractor hood on a tractor body so as to enable the hood to open upwardly and backwardly from the front end of the tractor, the hinge assembly comprising a double-rocker, four-link mechanism, including a hood-mounted bracket comprising one link, the hood-mounted bracket being mounted to an underside of the tractor hood, near a back end of the tractor hood;

wherein the double-rocker, four-link mechanism includes a lower, fixed link having a first end and a second end, an upper, coupler link being said one link of the hood-mounted bracket and having a first end and a second end, a front rocker link and a back rocker link, said front rocker link having a lower end connected pivotally to said first end of the fixed link and an upper end connected pivotally to said first end of the coupler link, said back rocker link having a lower end connected pivotally to said second end of the fixed link and an upper end connected pivotally to said second end of the coupler link;

wherein the front, back, and coupler links are displaceable so that the upper end of the back link is movable toward and away from the lower end of the front link, between positions on opposite sides of a line drawn from the lower end of the back link to the first end of the coupler link.

2. The hinge assembly of claim 1, wherein the first and second ends of the lower, fixed link are each defined by a body bracket mounted to the tractor body.

3. The hinge assembly of claim 2, wherein the rocker links are comprised of a comparatively longer, front link and a comparatively shorter, back link and wherein the coupler link is the shortest link.

4. The hinge assembly of claim 1, wherein the hood-mounted bracket is secured adhesively to the hood and the hood is composed of a polymeric material and wherein the hood-mounted bracket is composed of metal.

5. The hinge assembly of claim 1, wherein the hood-mounted bracket is secured adhesively to the underside of the hood.

6. The hinge assembly of claim 1, wherein the hood is composed of vacuum-formed polypropylene and said hood-mounted bracket is composed of steel, which is secured adhesively to the hood.

7. For a tractor equipped with a loader bucket, a hinge assembly for hinging a tractor hood on a tractor body so as to enable the hood to open upwardly and backwardly from the front end of the tractor, the hinge assembly comprising a double-rocker, four-link mechanism, including a hood-mounted bracket comprising one link, the hood-mounted bracket being mounted to an underside of the tractor hood, near a back end of the tractor hood;

wherein the double-rocker, four-link mechanism includes a lower, fixed link having two opposite ends, each defined by a body bracket mounted to the tractor body, an upper, coupler link being said one link of the hood-mounted bracket and having two opposite ends, and two rocker links, each rocker link having a lower end connected pivotally to one of the opposite ends of the fixed link and each rocker link having an upper end connected pivotally to one of the opposite ends of the coupler link;

wherein the rocker links are comprised of a comparatively longer, front link and a comparatively shorter, back link and wherein the coupler link is the shortest link;

wherein the front, back, and coupler links are displaceable so that the upper end of the back link is movable toward and away from the lower end of the front link, between positions on opposite sides of a line drawn from the lower end of the back link to the first end of the coupler link; and further comprising an extensible-retractable spring connected between the rocker links so as to bias the upper end of the back link toward the lower end of the front link.

8. The hinge assembly of claim 7, wherein the hood-mounted bracket is secured adhesively to the underside of the hood.

9. The hinge assembly of claim 8, wherein the hood is made from a polymeric material and wherein the hood-mounted bracket is made from steel.

10. The hinge assembly of claim 7, wherein the hood is composed of vacuum-formed polypropylene and said hood-mounted bracket is composed of steel, which is secured adhesively to the hood.

11. A hinge assembly for hinging a hood on a utility vehicle body so as to enable the hood to open upwardly and backwardly from the front end of the utility vehicle, the hinge assembly comprising a double-rocker, four-link mechanism, including a bracket comprising one link, the bracket being mounted to an underside of the hood, near a back end of the hood;

wherein the double-rocker, four-link mechanism includes a lower, fixed link having two opposite ends, each defined by a bracket mounted to the utility vehicle body, an upper, coupler link defined by a portion of the hood-mounted bracket and having two opposite ends, and two rocker links, each rocker link having a lower end connected pivotally to one of the opposite ends of the fixed link and each rocker link having an upper end connected pivotally to one of the opposite ends of the coupler link;

wherein the rocker links are comprised of a comparatively longer, front link and a comparatively shorter, back link and wherein the coupler link is the shortest link;

wherein the front, back, and coupler links are displaceable so that the upper end of the back link is movable toward and away from the lower end of the front link, between positions on opposite sides of a line drawn from the lower end of the back link to the first end of the coupler link;

and comprising an extensible-retractable spring connected between the rocker links so as to bias the upper end of the back link toward the lower end of the front link;

wherein the spring has a front end connected pivotally to the front link and a back end connected pivotally to the back link and wherein, as measured along the front and back links respectively, the front end of the spring is comparatively closer to the lower end of the front link and the back end of the spring is comparatively farther from the lower end of the back link.

12. The hinge assembly of claim 11, wherein the hood-mounted bracket is secured adhesively to the underside of the hood.

13. The hinge assembly of claim 12, wherein the hood is made from a polymeric material and wherein the hood-mounted bracket is made from steel.

14. The hinge assembly of claim 11, wherein the hood is composed of vacuum-formed polypropylene and said hood-mounted bracket is composed of steel, which is secured adhesively to the hood.

15. The hinge assembly of claim 11, wherein said utility vehicle comprises a tractor equipped with a front end loader bucket.

* * * * *